US007822240B2

(12) United States Patent
Ayache et al.

(10) Patent No.: US 7,822,240 B2
(45) Date of Patent: Oct. 26, 2010

(54) IMAGE PROCESSING DEVICE AND METHOD FOR DETECTING DEVELOPING LESIONS

(75) Inventors: Nicholas Ayache, Nice (FR); Grégoire Malandain, Antibes (FR); David Rey, Le Plan de Grasse (FR); Jonathan Stoeckel, Antibes (FR)

(73) Assignee: Inria Institut National de Recherche en Informatique et en Automatique, Le Chesnais Cedex (FR)

( * ) Notice: Subject to any disclaimer, the term of this patent is extended or adjusted under 35 U.S.C. 154(b) by 898 days.

(21) Appl. No.: 10/492,015

(22) PCT Filed: Oct. 4, 2002

(86) PCT No.: PCT/FR02/03396

§ 371 (c)(1),
(2), (4) Date: Mar. 3, 2005

(87) PCT Pub. No.: WO03/044719

PCT Pub. Date: May 30, 2003

(65) Prior Publication Data
US 2005/0141757 A1 Jun. 30, 2005

(30) Foreign Application Priority Data
Oct. 12, 2001 (FR) ................................. 01 13192
Dec. 6, 2001 (FR) ................................. 01 15780

(51) Int. Cl.
*G06K 9/00* (2006.01)
(52) U.S. Cl. .................................................... 382/128
(58) Field of Classification Search .................. 382/128
See application file for complete search history.

(56) References Cited

U.S. PATENT DOCUMENTS

| 5,546,472 | A | * | 8/1996 | Levin | 382/131 |
| 5,617,861 | A | * | 4/1997 | Ross et al. | 600/410 |
| 5,991,028 | A | * | 11/1999 | Cabib et al. | 356/456 |
| 6,123,919 | A | * | 9/2000 | Albert et al. | 424/9.3 |
| 6,249,594 | B1 | * | 6/2001 | Hibbard | 382/128 |

OTHER PUBLICATIONS

Goldszal et al., An image processing system for qualitative and quantitative volumetric analysis of brain images, Journal of Computer Assisted Tomography, 22(5): pp. 827-837, Sep. 10, 1998.*

(Continued)

*Primary Examiner*—Bhavesh M Mehta
*Assistant Examiner*—David P Rashid
(74) *Attorney, Agent, or Firm*—Foley & Lardner LLP

(57) ABSTRACT

The invention concerns an image processing device, including an input for receiving a time series of data sets representing comparable volume digital images, each data having a position component and an intensity component, pre-processing means for modifying the data sets so as to obtain images updated in position and intensity, and comparative processing means for examining sets of time series of image elements and to detect therein signs of variations. The processing means include a modeling function for adjusting a parametric model separately on some of the sets of time series of image elements, to obtain pairs of data (image element, time) and a function for statistical analysis of said pairs of data to isolate the pairs of data representing a significant variation.

33 Claims, 10 Drawing Sheets

OTHER PUBLICATIONS

Li et al., Transient and Permanent Resolution of Ischemic Lesions on Diffusion-Weighted Imaging After Brief Periods of Focal Ischemia in Rats; Stroke. 2000; vol. 31, pp. 946-954.*

Exploring the discrimination power of the time domain for segmentation and characterization of lesions in serial MR data, Medical Image Analysis 4, 2000, pp. 31-42.*

Gerig et al., "Exploring the Discrimination Power of the Time Domain for Segmentation and Characterization of Lesions in Serial MR Data," Medical Image Analysis, Elsevier Science, vol. 4, (2000), pp. 31-42.

* cited by examiner

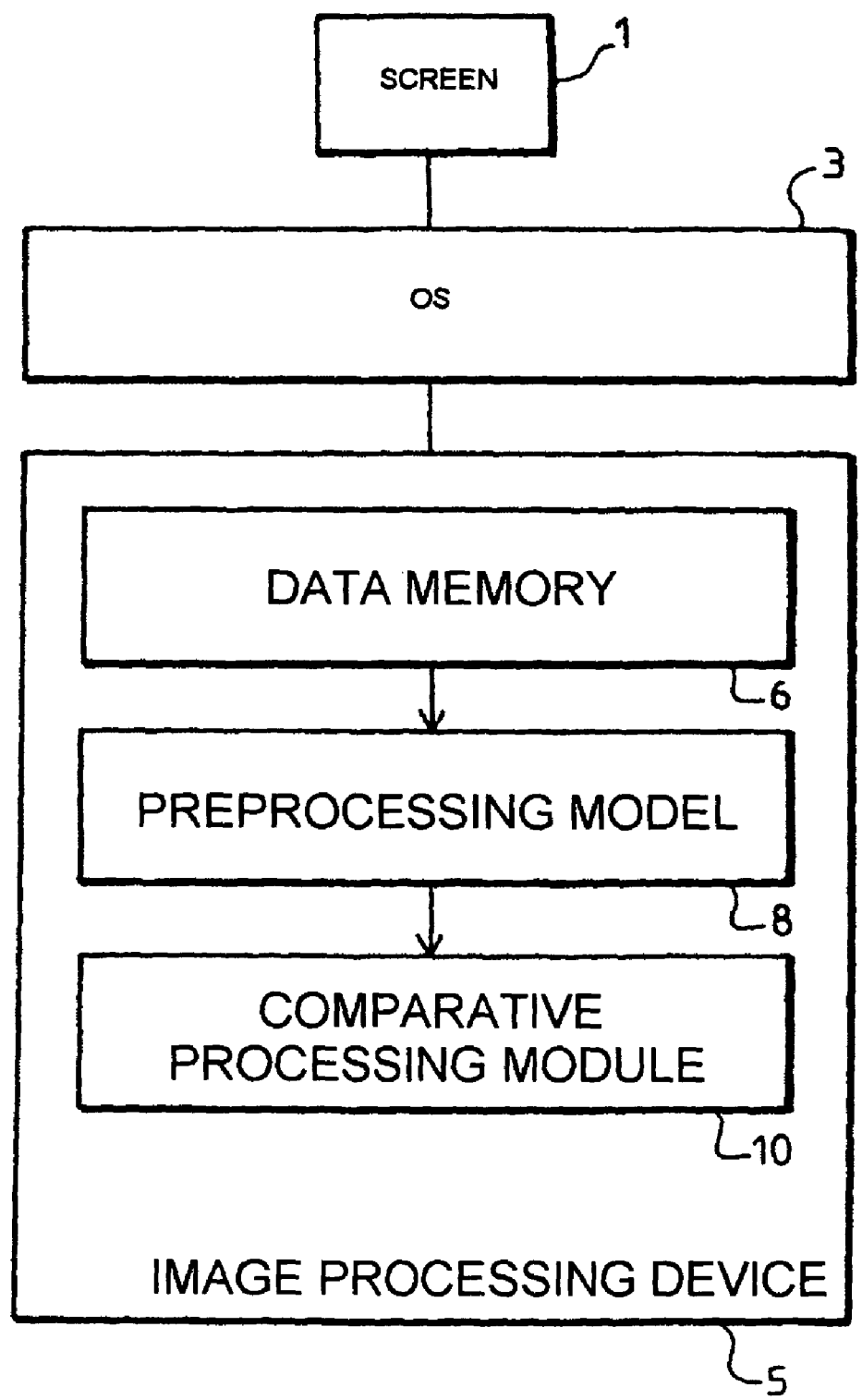
(PRIOR ART) FIG.1a

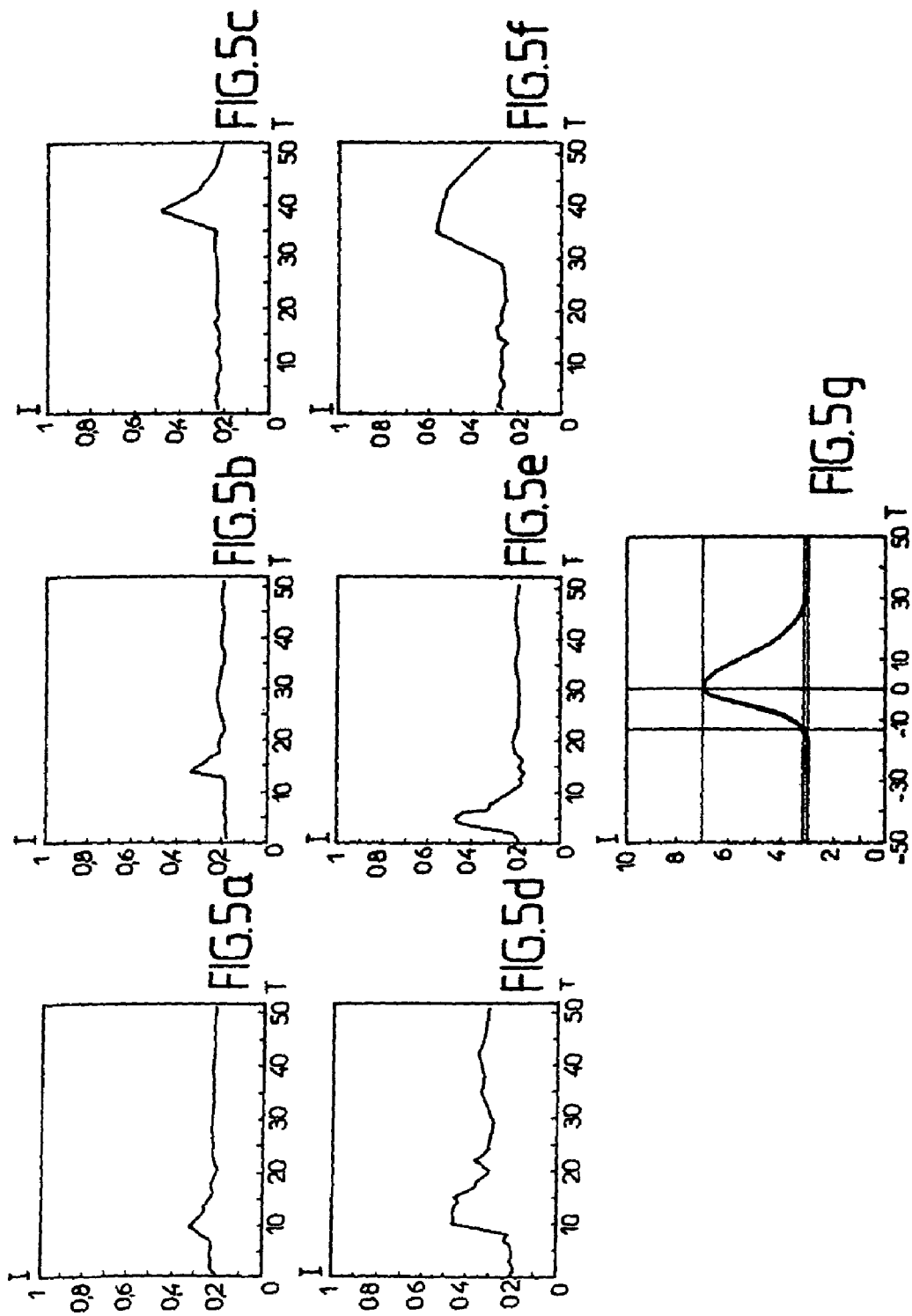

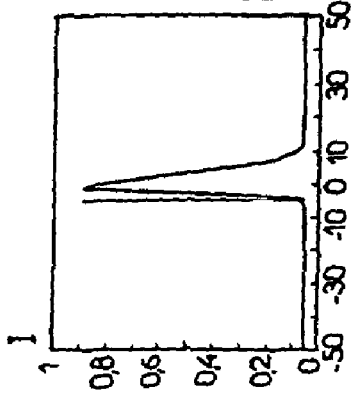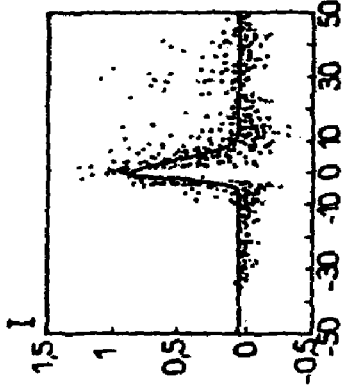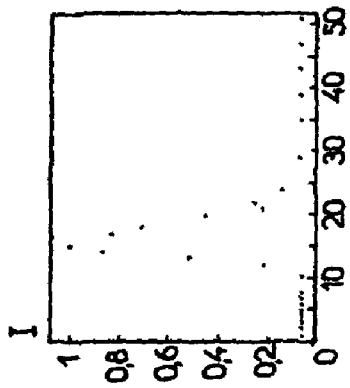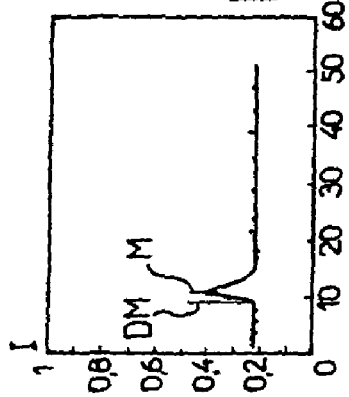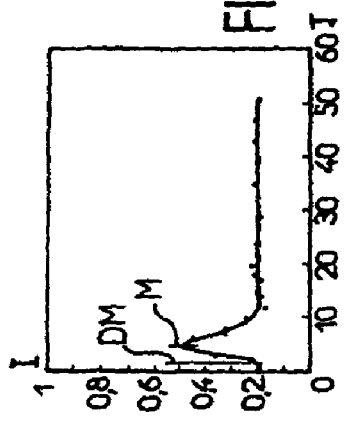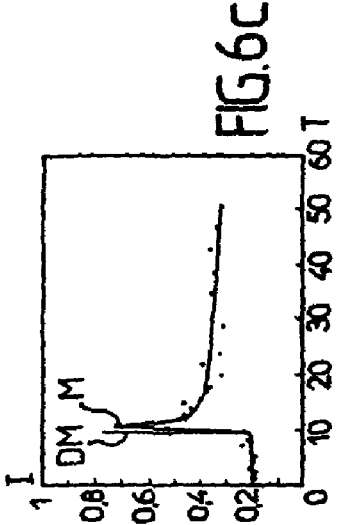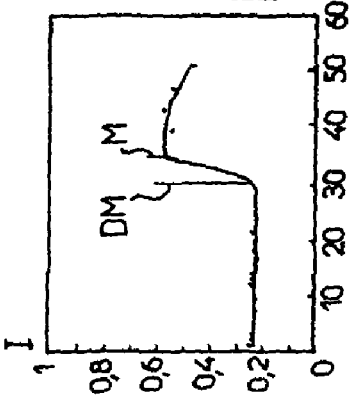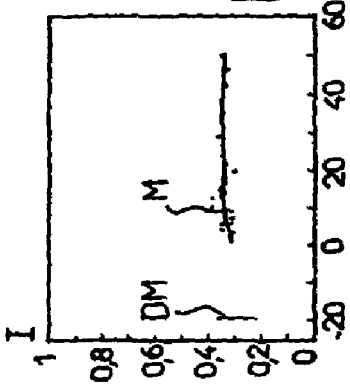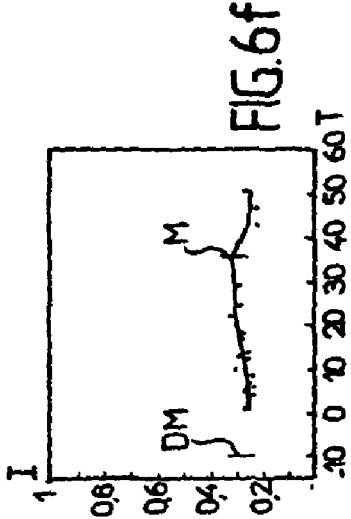

IMAGE PROCESSING DEVICE AND METHOD FOR DETECTING DEVELOPING LESIONS

BACKGROUND OF THE INVENTION

The invention relates to the processing of images, in particular medical images.

The processing of images makes it possible in particular to intercompare images. According to certain current techniques, the images are compared pairwise. Other techniques make it possible to compare the images of a series. Depending on the context, various categories of problems arise for rendering the images comparable, as will be seen.

These comparisons have very diverse applications, for example in the medical field for aiding diagnosis of pathologies. In the case of the comparison of the images of a time series that are captured over a given period, it is possible to detect pathologically developing zones.

In a particular application of image processing, for example in the case of multiple sclerosis lesions, medical images may be analyzed temporally and automatically so as to establish a detection of pathologically developing zones. Automatic temporal analysis techniques are used especially to provide aid for patient diagnosis. The performance of the currently used temporal and automatic analysis techniques is limited, in particular in the case of the detection of pathologically developing zones. In the medical field, these techniques are ill-suited for example for quantifying a posteriori the effect of medications administered in the case of therapeutic trials. More generally, fine evolutionary developments in pathologically developing zones have to be detected from one image to another. It has to be possible to do so with regard to snapshots spaced over time, and also with regard to a phenomenon in progress, that is to say one whose beginning was not observed.

BRIEF SUMMARY OF THE INVENTION

Generally, the present invention aims to improve the situation.

The invention relates to an image processing device, comprising:
  an input for receiving a time series of data sets representing comparable volume-based digital images, each data item comprising a position component and an intensity component,
  preprocessing means for modifying the data sets so as to obtain images registered geometrically and intensity-wise, and
  means of comparative processing, able to examine sets of time series of image elements, so as to detect signs of variations therein.

According to a main characteristic of the invention, the processing means comprise:
  a modeling function, capable of fitting a parametric model separately over certain at least of the sets of time series of image elements, thereby providing information pairs of the kind: image element, time; and
  a function for statistical analysis of these information pairs, which is able to isolate those of the information pairs that are representative of a significant variation.

The invention relates to a method of image processing, comprising the following steps:
  a—receiving a time series of data sets representing comparable volume-based digital images, each data item comprising a position component and an intensity component,
  b—modifying the data sets so as to obtain images registered geometrically and intensity-wise.

According to a main characteristic of the invention, the method comprises the complementary steps
  c—fitting a parametric model separately over certain at least of the sets of time series of image elements, thereby providing information pairs of the kind: image element, time,
  d—isolating those of the information pairs that are representative of a significant variation by statistical analysis.

Other characteristics and advantages of the invention will become apparent on examining the detailed description hereinbelow, as well as the appended drawings in which:

BRIEF DESCRIPTION OF THE DRAWINGS

FIG. 1a illustrates a computing device comprising an image processing device according to the prior art, FIGS. 5a, 5b, 5c, 5d, 5e, 5f are profiles of intensity I developing over time T of six selected points of a brain, FIG. 5g is an example of the parametric model with certain parameters, FIG. 5h is a mean model of intensity profile calculated inter alia according to the intensity profiles of FIGS. 5a to 5f, FIG. 5i is the mean model of intensity profile of FIG. 5h superposed on the normalized discrete measurements, FIG. 5j is a discretization of the mean model of intensity profile of FIG. 5i, FIGS. 6a to 6f represent intensity profiles I on which the rise times are calculated.

DETAILED DESCRIPTION

Figure 1B:
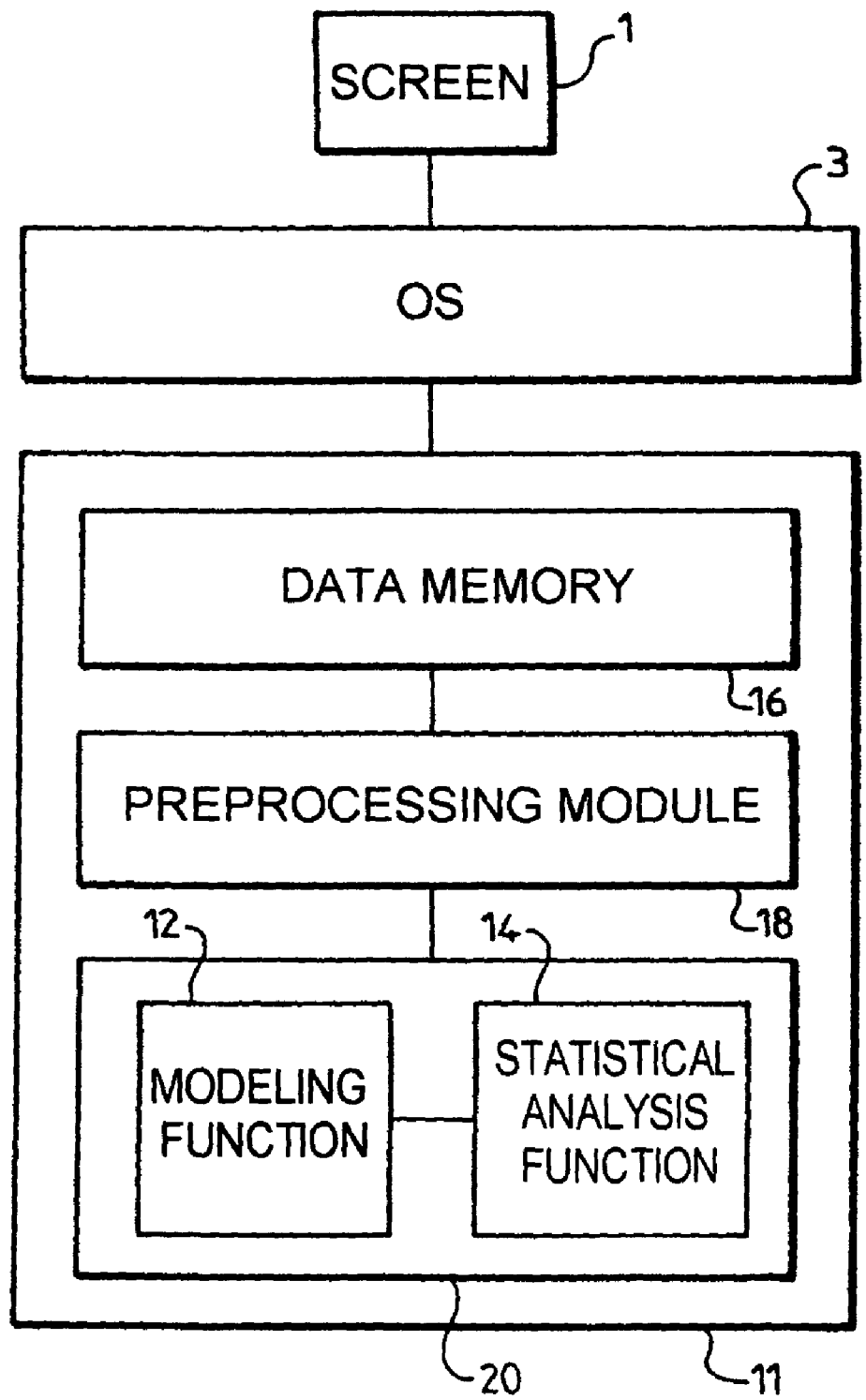
FIG. 1b illustrates a computing device comprising an image processing device according to the invention.

Moreover, the detailed description is accompanied by appendix I, in which is presented an example of a parametric model, an example of the linear model and the calculation of the Student variable.

The drawings contain, in essence, elements of a definite nature. They may therefore not only serve for a better understanding of the description, but also contribute to the definition of the invention, as the case may be.

The applicant has already formulated proposals in EP 0 927 405, EP 0 977 148 and EP 0 564 318.

Various publications have also been produced by the applicant:

"New feature Points Based on Geometric Invariants for 3D Image Registration", Jean-Philippe Thirion, International Journal of Computer Vision, 18(2):121-137.

"Recalage d'images médicales per inférence statistique" [Registration of medical images by statistical inference], Alexis Roche, Doctoral Thesis, Université de Nice-Antipolis, January 2001.

"Etude de la symétrie bilatérale en imagerie cérébrale volumique" [Study of bilateral symmetry in volume-based brain imaging], Sylvain Prima, Doctoral Thesis, Universite de Paris. XI, March 2001.

"Automatic Quantification of changes in the Volume of Brain Structures", Guillaume Calmon, Neil Roberts, Paul Eldridge and Jean-Philippe Thirion, First International Conference on Medical Image Computing and Computer-Assisted Intervention—MICCAI'98, Lecture Notes in Computer Science 1496(1998), 964-973.

"Automatic Detection and Segmentation of Evolving Processes in 3D Medical Images: Application to Multiple Sclerosis", David Rey, Gérard Subsol, Hervé Delingette et Nicholas Ayache, Information Processing in Medical Imaging—IMPI'99, Lectures Notes in Computer Science 1613(1999) 154-167.

"Using Continuum Mechanics Operators for Detection and Quantification of Evolving Processes in 3D Medicals Images", David Rey, Hervé Delingette, Gérard Subsol, Nicholas Ayache, EUROMECH'99, 1999, 185-188.

The performance of the currently used temporal and automatic analysis techniques is limited, in particular in the case of the detection of pathologically developing zones. In the medical field, these techniques do not make it possible, a posteriori, to rigorously quantify the effect of medications administered in the case of therapeutic trials.

Generally, the image processings in question require a preprocessing. To allow temporal and automatic analysis of images, these image preprocessing techniques are applied beforehand to the images to be analyzed. These techniques, presented hereinbelow, have the objective of rendering the images intercomparable and of allowing the analysis of these images.

Image comparison generally requires two preprocessing operations. These operations allow normalization (or calibration) of the images so as to compare them. In medical imaging, these two preprocessing operations are applied in the case of the comparing of images originating from acquisitions on patients.

A first operation is a geometrical registration of the images with respect to a reference image. Depending on the case, this registration may be rigid, that is to say it does not change the shapes, or else affine, where it will modify the shapes either according to a certain number of degrees of freedom or else a more general transformation. It should be observed in passing that one is generally concerned with three-dimensional images, the volume element of which is also called a "voxel". However, one may also be concerned with two-dimensional images.

Thus, it will be understood that it is very difficult to obtain an exact volume-wise match of a part of the body of a patient, for example his brain, from one examination to another, without a prior registration of the images. Moreover, the shape of the body part examined may have undergone a slight evolution or development. The techniques of rigid or affine registration make it possible to reduce all the images to one and the same basic geometry. An example of such a technique is described in EP 0 977 148, already cited.

Aside from this, the images may exhibit "spatial bias" and "temporal bias". Thus, the image may exhibit a "spatial bias" that is to say that in certain of the images there will exist zones whose intensity will be greater, that is to say more luminous (brighter) zones and zones whose intensity will be not as great, that is to say less luminous (darker) zones.

This "spatial bias" may be dealt with, for example in the manner described in:

"Etude de la symétrie bilatérale en imagerie cérébrale volumique" [Study of bilateral symmetry in volume-based brain imaging], Sylvain Prima, Doctoral Thesis, Université de Paris XI, March 2001.

"Automated Model-Based Bias Field Correction for MR Images of the Brain", K. Van Leemput, F. Maes, D. Vandermeulen, and P. Suetens, IEEE Transactions on Medical Imaging 18(10):885-896, 1999.

The less often tackled problem of "temporal bias" still remains. In our case, it can be defined as the fact that the gray scale varies from one image to another.

Certain imaging techniques allow calibration that can be dubbed absolute, in the sense that it is possible to retrieve the same levels of luminosity, of contrast in images originating from examinations spaced several weeks or even several months apart. Such is the case with certain medical imaging techniques for example.

Other techniques, which do not allow this absolute calibration, will therefore provide images marred by "temporal bias". Such is the case, in particular, for nuclear magnetic resonance imaging (MRI) machines.

One proposal for attempting to correct "temporal bias" has been made in:

"New variants of a method of MRI Scale Normalization", Laslo G. Nyul, Jayaram K. Udupa, Information Processing in Medical Imaging-IPMI'99, Lecture Notes in Computer Science 1613 (1999), 490-495.

However, whatever the quality of these preprocessings, the existence of "temporal bias" makes the automatic comparison of images captured in a staggered manner over several weeks or several months particularly difficult. This is particularly detrimental with regard to the monitoring of various disorders, for example multiple sclerosis. The invention aims in particular to improve the preprocessing of the temporal bias, this subcharacteristic of the invention is of interest as such and may be claimed separately. This improvement is not the main characteristic of the invention, the latter pertaining rather to the temporal, quantitative and automatic analysis of images.

Moreover, the automatic temporal analysis of medical images allows detection of pathologically developing zones to be established a posteriori, for example in the case of multiple sclerosis lesions. This detection is particularly useful for the a-posteriori monitoring of the effect of certain medications on the organism in the case of therapeutic trials. Procedures for temporal analysis of medical images have been proposed in the following works:

Patent EP 0 927 405 "Dispositif électronique de traitement d'images pour la détection de variations dimensionnelles" [Electronic device for processing images for the detection of dimensional variations], Guillaume Calmon, Jean-Philippe Thirion, "Automatic Quantification of changes in the Volume of Brain Structures", Guillaume Calmon, Neil Roberts, Paul Eldridge and Jean-Philippe Thirion, First International Conference on Medical Image Computing and Computer-Assisted Intervention—MICCAI'98, Lecture Notes in Computer Science 1496(1998), 964-973.

"A Computerized Approach for Morphological Analysis of the Corpus Callosum", Chris Davatzikos, Marc Vaillant, Susan M. Resnick, Jerry L. Prince, Stanley Letovsky and R. Nick Bryan, Journal of Computer Assisted Tomography—JCAT, vol. 20, pp. 88-97, 1996.

"Automatic Detection and Segmentation of Evolving Processes in 3D Medical Images: Application to Multiple Sclerosis", David Rey, Gérard Subsol, Hervé Delingette and Nicholas Ayache, Information Processing in Medical Imaging—IPMI'99, Lectures Notes in Computer Science 1613(1999) 154-167.

"Using Continuum Mechanics Operators for Detection and Quantification of Evolving Processes in 3D Medicals Images", David Rey, Hervé Delingette, Gérard Subsol, Nicholas Ayache, EUROMECH'99, 1999, 185-188.

These techniques make it possible in particular to detect and quantify the developing zones within image series. In most cases, the analysis is performed on pairs of successive images. Thus, these techniques make it possible to perform a short-term analysis of the development of lesions to aid immediate diagnosis of the patient.

A procedure of automatic temporal analysis of medical images has been proposed in the following work:

"Exploring the discrimination power of the time domain for segmentation and characterization of active lesions in serial MR", Guido Gerig, Daniel Welti, Charles R. C. Guttmann, Alan C. F. Colchester, Gabor Székely, Medical Image Analysis—MedIA, 4 (1) 31-42, 2000.

This automatic temporal analysis technique allows the detection over a series of images of a patient of pathologically developing zones. However, this technique is limited to the consideration of temporal information for each volume unit considered (called a voxel), for example the temporal profile of intensity for each volume unit. A descriptive statistic (mean mapping, standard deviation) and fuzzy logic are applied to this temporal information. These mappings do not allow account to be taken of the spatial dimension of the pathologically developing zones.

Figure 4A:
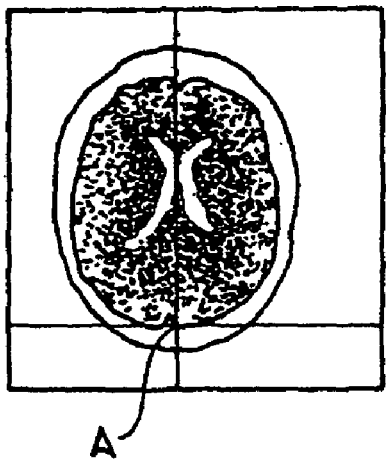
FIG. 4a is a brain image representing a first 3D image.
Figure 4B:
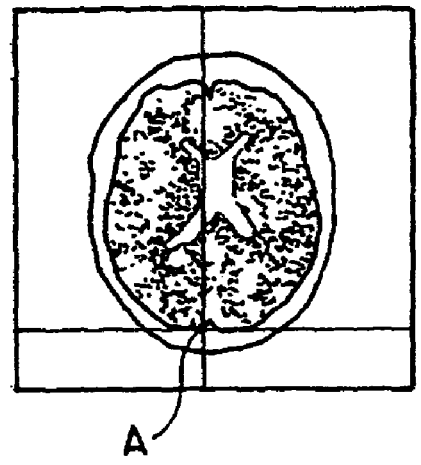
FIG. 4b is a brain image representing a second 3D image having a spatial shift and a temporal bias with the first image.

Reference is made to figure 1a describing the state of the art and to FIGS. 4a, 4b, 4c and 4d. A display screen 1, for example a computer screen, is linked to an operating system 3, itself linked to an image processing device 5. This device 5 comprises a data memory 6, a preprocessing module 8 and a comparative processing module 10. The data memory 6 is suitable for storing data as 3D image series, for example data of voxels represented by a spatial position with spatial coordinates (x, y, z) for each voxel and an intensity $I(x, y, z, t_1)$ at a given instant $t_j$ for each voxel. j is an integer that can vary from 1 to n, n being an integer representing the number of different instants at which 3D images of one and the same patient are acquired. These 3D image series may be series of images of one and the same patient captured according to the MRI imaging technique. Since the images are acquired at temporally remote instants (a week or even more), the patient does not adopt the same position. This is illustrated by images 4a and 4b representing respectively a first image acquired at a given instant and a second image acquired at a different instant exhibiting a spatial shift with respect to the first image 4a. Thus, as indicated in FIGS. 4a and 4b, a coordinate (x, y, z) of a voxel of an image does not correspond to the same anatomical point in all the images of the series. Moreover, the medical image acquisition techniques may introduce inhomogeneities into the image itself (spatial bias) or between images acquired at different instants (temporal bias) into each image and/or between the images of a series. This is illustrated by images 4a and 4c representing respectively a first image acquired at a given instant and a second image, acquired at a different instant, aligned with the first image but exhibiting a temporal bias with respect to the first image 4a.

Figure 4C:
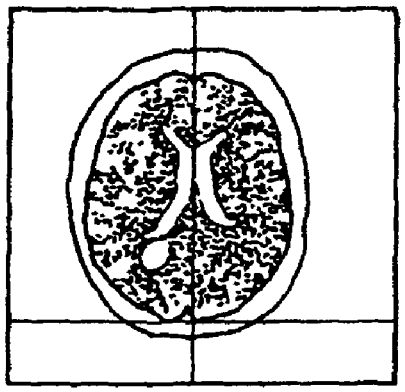
FIG. 4c is a brain image representing the second 3D image of FIG. 4b whose spatial shift has been corrected.
Figure 4D:
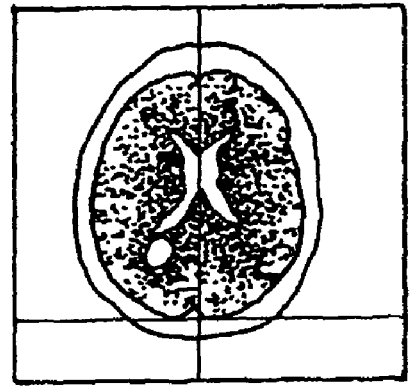
FIG. 4d is a brain image representing the second 3D image of FIG. 4c whose temporal bias has been corrected.

Also, as seen previously, the preprocessing module 8 is suitable for performing various preprocessings:

aligning the images of a series with one of the images captured as reference by a registration (rigid, affine or other) as presented in FIG. 4c which represents the image 4b aligned with FIG. 4a, possibly correcting the spatial bias and the temporal bias according to techniques set forth in the works cited previously. The correction of the temporal bias is presented in FIG. 4d which represents the image 4c corrected with respect to FIG. 4a.

Moreover, the comparative processing module 10 is suitable, after image preprocessing, for automatic temporal analysis of the images, in particular of the images of the brain in the case of multiple sclerosis. This comparative processing module 10 is able to operate according to one of the techniques of the works cited previously.

However, these techniques do not allow quantitative statistical analysis of a time series of images. Such an analysis would make it possible to retrieve the zones corresponding to pathological development by virtue of a calculation of probabilities. In particular, this is indispensable for conducting a rigorous statistical study of the effect of medications administered in the case of therapeutic trials.

FIG. 1b is an embodiment of the device according to the invention. Associated with the display screen 1 and with the operating system 3, an image processing device 11 comprises a data memory 16, a preprocessing module 18 and a comparative processing module 20. The data memory 16 is able to store for example in memory, for each 3D image formed of voxels of dimensions 1×1×3 mm, 54 2D image sections of format 256×256. The preprocessing module 18 corresponds to the preprocessing module 8 of the prior art. Advantageously, the preprocessing module 18 comprises a temporal bias correction function for the intensities of MRI voxels which is based on an algorithm allowing the correction of the joint histogram of two images. This histogram represents the intensities of one image with respect to the intensities of the other. The algorithm is based on searching for a regression line by the robust orthogonal least squares procedure, which procedure is expanded on in the publication "CRC Concise Encyclopedia of Mathematics", E. Weisstein, CRC Press LLC, November 1998.

The regression line J=a.I+b is obtained, J representing the intensity of a first image, I the intensity of a second image. The correction is obtained by applying the transformation thus found to the second image. Thus, image 3a is formed of an alternation of cubes of a first reference 3D image and of a second image exhibiting a temporal bias with respect to the first reference image. As far as the image 3c is concerned, it represents the joint histogram corresponding to the image 3a. By applying the temporal bias correction algorithm, the image 3b exhibits only a difference between the first reference image and the second corrected image, which difference is represented by the cube B. The histogram 3d corresponds to this image 3b representing a comparison between the reference image and the second corrected image.

The comparative processing module 20 comprises a modeling function 12 and a statistical analysis function 14. The modeling function 12 is able to model a curve representing the intensity profile of voxels of developing zones evolving over time. This function is based on a parametric mathematical model that can represent the shape of the various intensity profiles.

On the basis of this modeling described later, the statistical analysis function 14 carries out a statistical inference. According to this statistical inference, it is possible to determine clusters of points or of voxels following "significantly", in the statistical sense, a model of pathological development.

Thus, the modeling function 12 and the statistical analysis function 14 of the comparative processing module 20 are presented hereinbelow according to a first preferential embodiment illustrated by FIGS. 5a to 5j, 6a to 6f and 7. A second preferential embodiment is also described later.

For example, for multiple sclerosis, such a curve typically comprises a part that rises and a part that falls over time. Thus, it has been chosen to model an asymmetric Gauss curve with five parameters, as is represented in annex I-a. The parameters of this curve represent p1, a maximum amplitude parameter,
p2, a minimum amplitude parameter,
p3, a time at the peak parameter,
p4, a reference width parameter and
p5, a dissymmetry parameter.

In this embodiment, a semi-manual procedure is used to calculate a mean model, as represented in FIG. 5g, of an asymmetric Gauss type curve by fixing the five parameters. This mean model will be referred to either as the mean model of intensity profile or the parametric mean model. Through this continuous mean model, the discrete time series of intensity values $I(x, y, z, t_1)$ measured at certain points $(x, y, z)$ in space is best approximated. Thus, an operator can select, on the previously corrected 3D images, a set of points corresponding to parts of developing lesions. Thus, FIGS. 5a to 5f illustrate six profiles of time-dependent intensity of six selected points. The "rise time" defined as the time taken by the intensity to go from 5% of its maximum to its maximum, that is to say the time between the vertical line DM and the maximum intensity M in FIGS. 6a to 6d, is calculated for each profile. The profiles corresponding to a "rise time" of less than a week or of more than ten weeks are rejected as not corresponding to an intensity profile regarded as pathological. Profiles 6e and 6f are aberrant and are therefore rejected. The profiles retained are centered and normalized according to their respective maximum. The mean model is then calculated according to the normalized profiles and according to a conventional least squares estimate. The five parameters are calculated according to a least squares estimate using Powell's quadratic convergence procedure presented in the following work:

[1]—W.H. Press, S. A. Teukolsky, W. T. Vetterling, and B. P. Flanery. Numerical Recipes. The Art of Computing. Cambridge University Press, $2^{nd}$ edition, 1997.

For example, in a study carried out on 54 extracted profiles, 43 profiles were retained and the mean model of intensity profile represented in FIG. 5h was calculated according to the intensity profiles of this set of selected points and according to the technique proposed hereinabove. FIG. 5i represents the mean model superimposed on the normalized discrete measurements. FIG. 5j represents a discretization of the mean model obtained.

The statistical analysis function is then used with this mean model obtained. It is repeated at the instants at which the developing zones are sought. For the case of multiple sclerosis, the statistical analysis is applied at each discrete instant $t_j$ with j=1 ... n, and n represents the number of images captured at different instants for each voxel. The general linear model makes it possible to search for the presence of the mean model of intensity profile at every voxel of the image. The general linear model is described in the following work:

[2] R. S. J. Frackowiak, K. J. Friston, C. D. Frith, R. J. Dolan, and J. C. Mazziotta. Human Brain Function. Academic Press, 1997.

Figure 7:
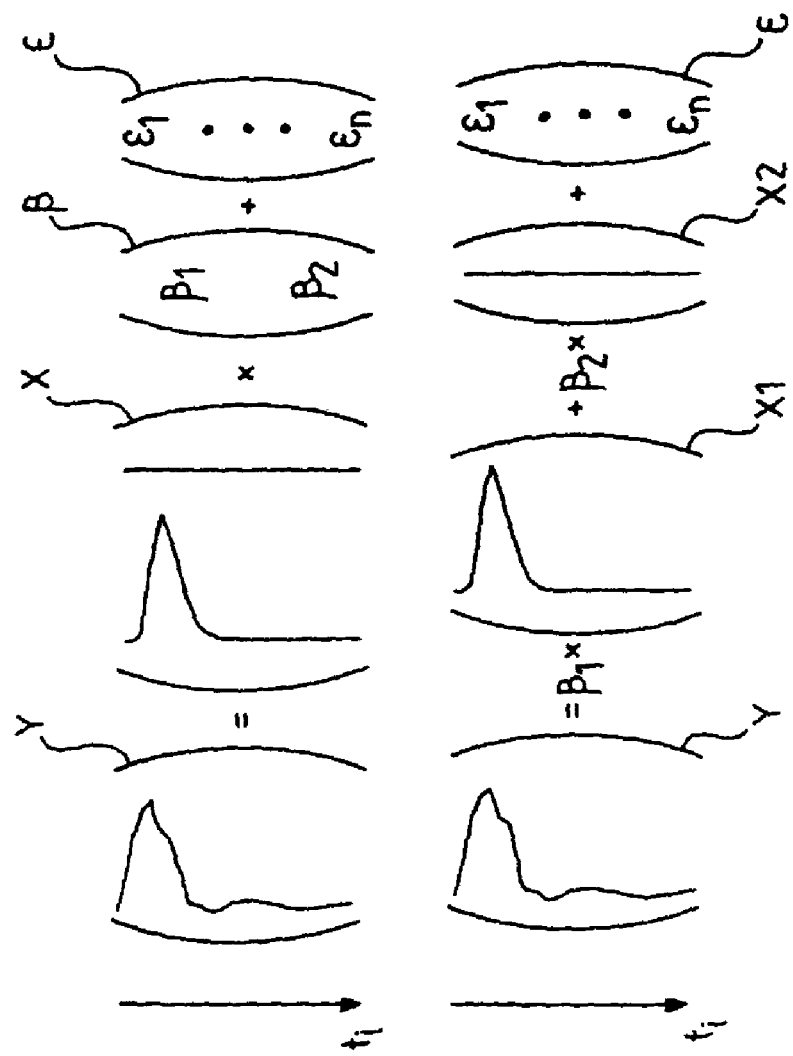
FIG. 7 is a diagrammatic representation of the general linear model.

Each voxel is fitted according to a general linear model as presented in appendix I-b. FIG. 7 illustrates this general linear model. Each column of a vector of dimension n×x, x being an integer, is composed of n components each referring to a discrete instant on the time scale ti. Each column of a vector thus forms a profile of discrete values as a function of time. Thus, the vector Y (dimension n×1) represents the discrete data of origin of the intensity profile of a given voxel. The matrix X (dimension n×2) is called the design matrix. X has as component, as illustrated in FIG. 7, the discrete values of the mean model of intensity profile, represented by the vector X1 (dimension n×1), and a constant value over time, represented by the vector X2 (dimension n×1), to take account of the mean intensity of the voxel over the course of time ti. The vectors X and Y are known. The components β1 and β2 of the vector β (2×1) respectively represent the variable of fit of the mean model of intensity profile and of the reference level of the intensity profile of a given voxel. The vector ε represents the vector of residual terms. The vectors β represents the estimated parameters of the general linear model.

The statistical inference makes it possible to detect the neighboring voxels having one and the same developing pathological behavior. To do this, a variable t is calculated for each voxel, called the Student variable as defined in annex I according to the work [2] and the following work:

[3] D. J. Sheskin. Handbook of Parametric and Non-parametric Statistical Procedures. CRC Press, 1997.

A t chart is compiled. In the formula for calculating t, $\sigma^2$ represents the residual variance estimated by the residual mean square. The vector c, defined in annex I-c, makes it possible to choose the variable β1 of the vector β. In the formula of annex I, the values of the variable β1 are divided by the residual variance. Estimating that the residuals are distributed according to a Gaussian distribution, the values of t follow a Student distribution (also called a "t distribution").

Voxels exhibiting significantly large values of t on the t chart obtained are selected when their t value is greater than a chosen threshold value Th. Groups of neighboring voxels appear among these selected voxels.

Statistical inference uses the theory of random fields expanded on in the work [2] and in the following work:

[4] K. J. Worsley. Local maxima and the expected euler characteristic of excursion sets of $\chi^2$, f and t fields. Advances in Applied Probability, 26:13-42, 1994.

This theory makes it possible to determine the probability of obtaining groups of voxels of a certain size. The groups of voxels having a very low probability of occurrence are regarded as "significant", that is to say in the case of a search for pathological zones, these groups of voxels are liable to represent a developing pathological zone. By virtue of this statistical analysis, it is possible to associate a probability with the size of a collection of neighboring voxels. Only the collections of neighboring voxels for which this probability of occurrence is sufficiently low are regarded as significant. A very low probability of occurrence may be a probability of 0.01 for example.

In order to be able to apply the theory of random fields, certain assumptions have to be satisfied:
homogeneity of the noise in the images;
good lattice representation;

temporal independence of the noise;
Gaussian noise;
homogeneity of the distribution function for the effective points.

A second embodiment is described hereinbelow. Thus, the curves representing the intensity profile of voxels of zones developing over time are modeled by a chosen parametric model. In this exemplary embodiment, the parametric model of annex I-a exhibiting an asymmetric Gauss curve with five parameters is chosen.

Thus, a parametric model is fitted at each voxel over a temporal intensity profile such as those shown in FIG. 5a to 5f. Stated otherwise, the parameters of a model are determined for each voxel. It may be difficult to simultaneously determine all the parameters of a model related to an intensity profile. Thus, advantageously, it is possible to fix for example the reference width parameter p4 and the dissymmetry parameter p5. These parameters are in fact estimated over a collection of time-normalized and amplitude-normalized profiles. Once these parameters have been fixed, the remaining parameters are evaluated for each voxel, such as for example the maximum amplitude p1, the minimum amplitude parameter p2, and the time at the peak parameter p3. The parameters are evaluated in the least squares sense using Powell's quadratic convergence procedure presented in the following reference:

W.H. Press, S. A. Teukolsky, W. T. Vetterling, and B. P. Flannery. *Numerical Recipes. The art of Scientific Computing*. Cambridge University Press, $2^{nd}$ edition, 1997.

Thus, intensity curves that differ according to the voxels are obtained. This result leads to a nonlinear analysis in this case.

In order to determine the probability of obtaining groups of voxels of a certain size, a statistical analysis is applied.

This statistical analysis is described in greater detail hereinbelow with reference to FIG. 2c.

Figure 2A:
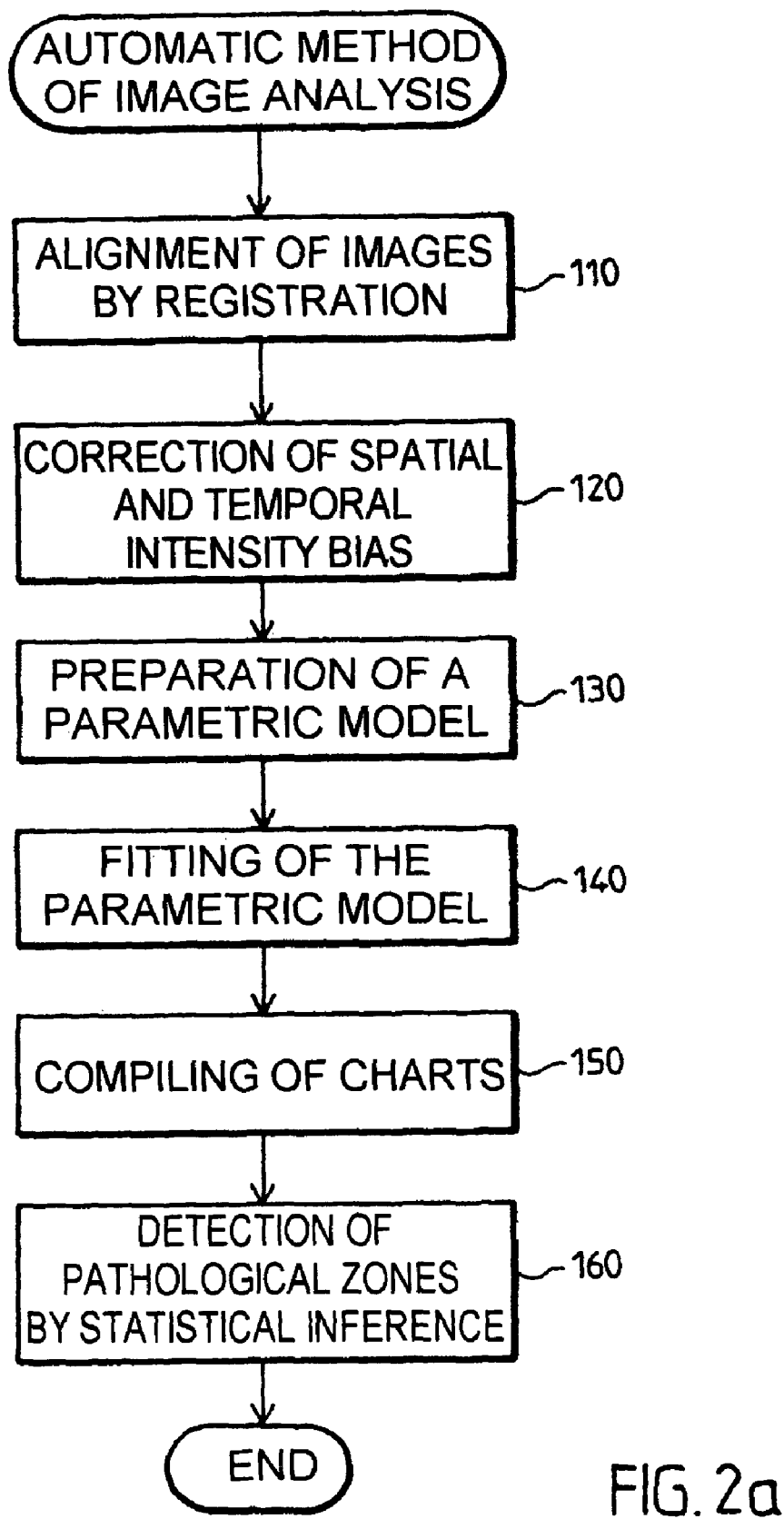
FIG. 2a represents a flowchart of the automatic method of image analysis.
Figure 2B:
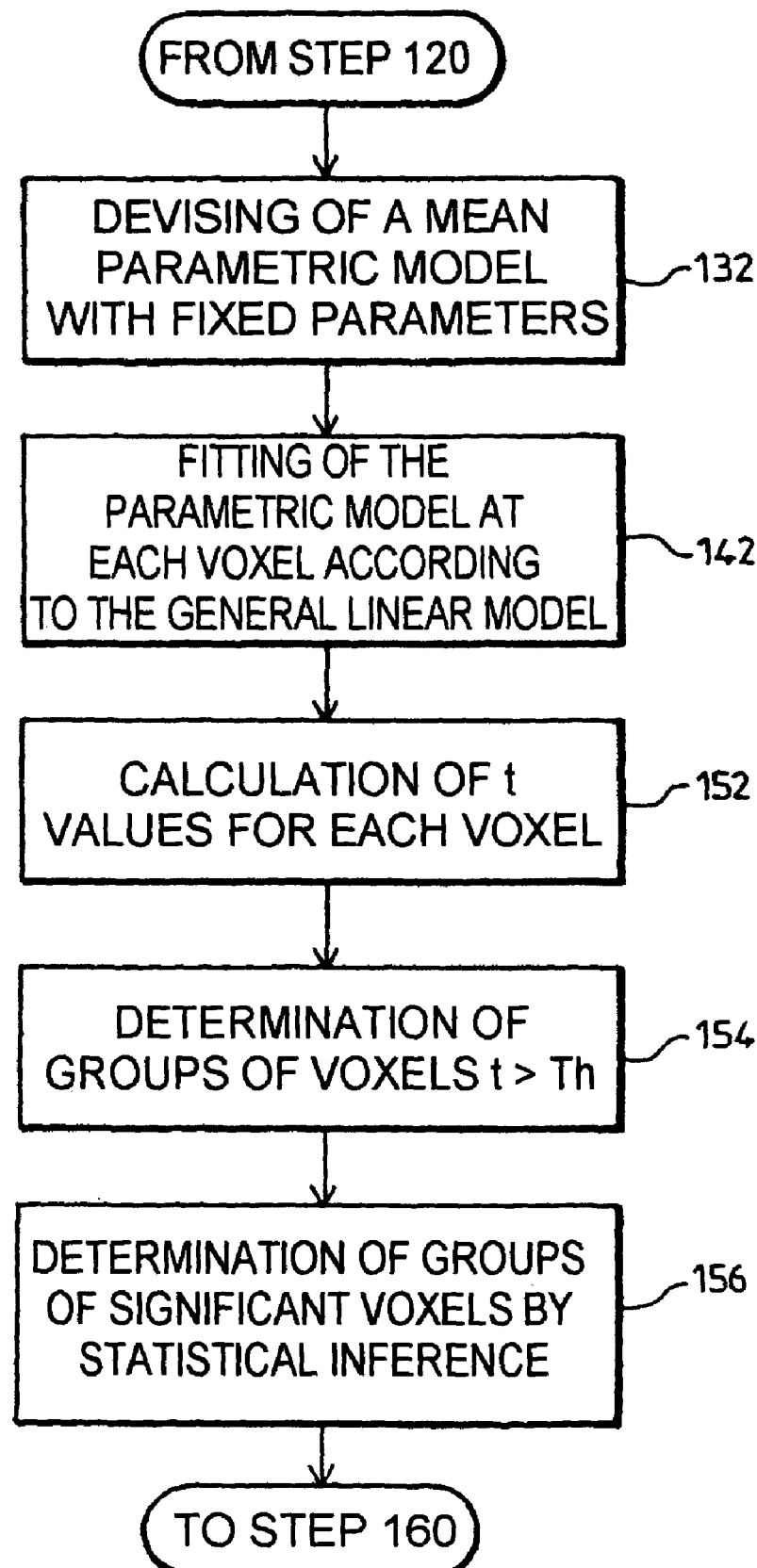
FIG. 2b represents a detailed part of the flowchart of FIG. 2a, FIG. 2c represents a detailed part of the flowchart of FIG. 2a according to a particular embodiment.

FIGS. 2a and 2b illustrate the automatic method of image analysis according to the invention.

In step 110, the 3D images of a patient over the course of time are aligned with a reference image by rigid registration as explained previously. In step 120, a temporal correction is performed on the 3D images, this correction relates to the intensity bias. A spatial correction may possibly be performed. Steps 130 to 150 present general steps customized by the flowchart of FIG. 2b. Thus, a parametric model of asymmetric Gaussian type comprising five parameters is prepared in step 130 to model the intensity profiles of the voxels of the 3D images. In this way, the parametric model is fitted to the intensity profiles of the voxels of the 3D images in step 140. Thus, a chart (or even several) making it possible to determine the groups of significantly pathological voxels is devised in step 150. The pathological zones may be detected by statistical inference in step 160.

FIG. 2b illustrates more particularly steps 130 to 150 of the method.

In step 132, a parametric mean model is devised beforehand in accordance with a set of voxel intensity profiles. According to one embodiment of the invention, this set of voxel intensity profiles is chosen by an operator as being a set of profiles representative of voxels exhibiting developing lesions. As described previously, the five parameters of the parametric mean model are thus fixed. In step 142, the parameters of the general linear model are estimated at each voxel of the brain. Thus, each intensity profile of a voxel presented in the form of a data vector is represented by a linear combination of the parametric mean model, of a constant and of the residuals.

In step 152, a t value calculation is performed for each voxel, that is to say a t chart is obtained. In step 154, the t chart makes it possible to determine the groups of voxels exhibiting a value greater than a threshold value Th.

By applying the theory of random fields described in the work [4] cited hereinabove, groups of voxels among those determined exhibit a very small probability of occurrence and form groups of significant voxels in step 156. In this way the probable pathological zones are detected and modeled. This statistical inference makes it possible to detect statistically significant pathological zones by taking into account the spatial and temporal structure of the series of 3D images.

Figure 2C:
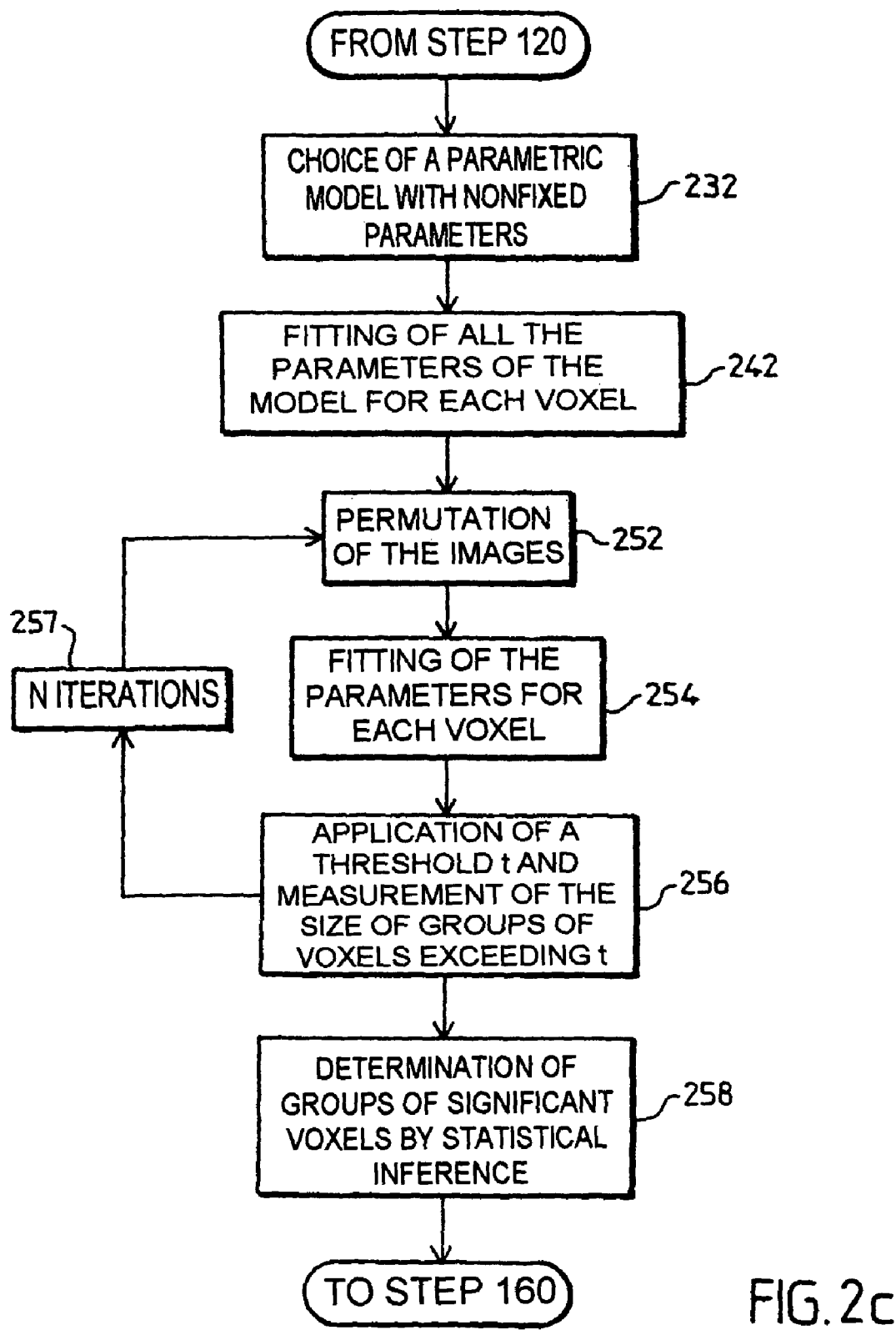
Figure 3A:
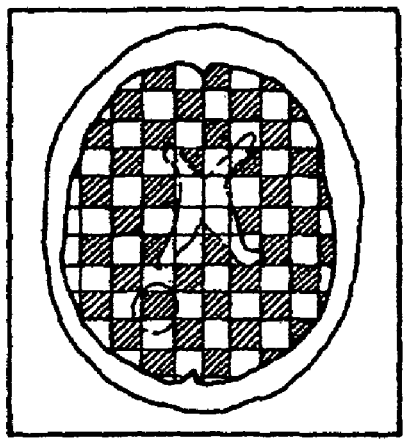
FIG. 3a is a brain image representing an alternation of cubes of a first 3D image and a second 3D image having a temporal bias with the first image.
Figure 3B:
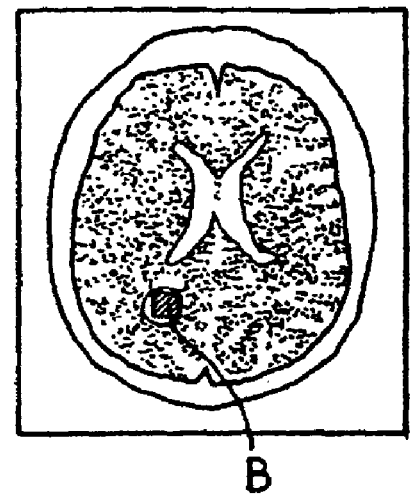
FIG. 3b is a brain image representing an alternation of cubes of the first 3D image of FIG. 3a and of the second 3D image corrected.
Figure 3C:
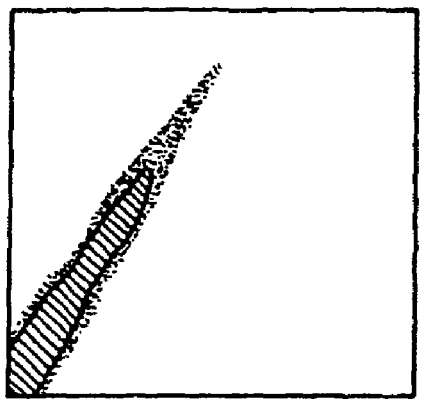
FIG. 3c represents the histogram related to FIG. 3a, this histogram representing the intensities of the first image with respect to the intensities of the second image.
Figure 3D:
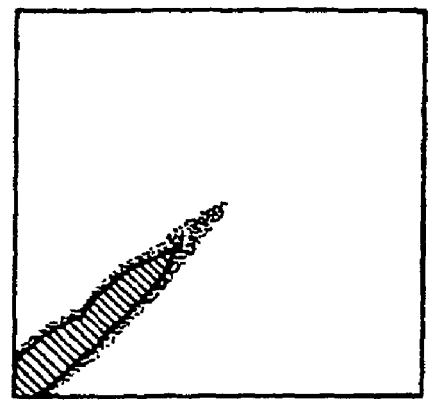
FIG. 3d represents the histogram related to FIG. 3b, this histogram representing the intensities of the first image with respect to the intensities of the second image corrected.

FIG. 2c illustrates more particularly steps 130 to 150 of the method according to a second embodiment.

In step 232, a parametric model is chosen, for example that of annex I-a. In this embodiment, in step 242, this model is determined independently for each voxel of a series of patient images. Thus, the parameters of the model are fitted for each voxel. This makes it possible to obtain a model with particular parameters for each voxel.

Advantageously, before step 242, at least one parameter may be determined according to a mean computed over a sample of voxels so as to reduce the calculation time for the other parameters for each voxel in step 242.

A statistical analysis is then performed for steps 252 to 258. In step 252, a permutation of the images is performed on the image series considered for which a particular parametric model has been determined for each voxel. The permutation of these images is advantageously random. In this way, each image is assigned randomly to an instant of the image series. More precisely, an identical permutation is applied to each voxel of each image to preserve the spatial correlation structure of the images.

In step 254, a parametric model is then fitted for each voxel as previously.

In step 256, a threshold t having an appropriate value is applied to at least one of the parameters determined previously for the voxels of the series of permuted images. In a particular manner, this value t is applied for example to the maximum amplitude of the models obtained. The voxels exceeding this value t are detected as being "out-of-threshold" voxels. Certain neighboring out-of-threshold voxels form groups of voxels whose size is then determined. The chosen value of t does not influence the validity of the statistics but the sensitivity of the results.

Steps 252 to 256 are repeated a given number of times, for example N times in step 257. This integer is determined in such a way as to correspond to correct calculation time requirements and to have a good approximation of the distribution of the probabilities of densities. For example, N may be equal to 10.

After a given number of iterations, the significant sizes of the groups of out-of-threshold voxels are determined by the procedure described hereinbelow. Thus, one seeks to obtain a distribution of the sizes of groups of voxels under a so-called null hypothesis. The null hypothesis is satisfied when no coherent pathological developing process exists. The distribution of the sizes of groups of voxels makes it possible to detect a developing lesion for the sizes of groups of voxels having a smaller probability of appearing than a critical value α under the null hypothesis. Thus, in step 258, the groups of significant voxels are determined by statistical inference.

Figure 8:
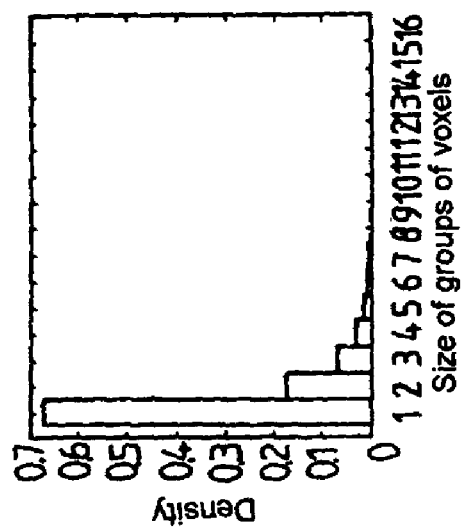
FIG. 8 represents a graph of the size distribution of groups of voxels according to the particular embodiment.

FIG. 8 illustrates a size distribution of groups of voxels for permuted image series. Thus, the bars represent the density obtained for each size of groups of voxels, calculated as the number of voxels per group. The density represents the number of groups of a given size divided by the total number of groups considered. In the example of FIG. 8, t has the value 0.2 and α has the value 0.01. In this example, the groups of significant voxels have a size of larger than 10 voxels.

The assumption according to which the images of the series can be swapped allows this permutation-based statistical procedure to be carried out rigorously.

The improvement of the preprocessing of the temporal bias is a subcharacteristic of the invention which is of interest as such and which may be claimed separately.

Of course, the invention is not limited to the embodiment described previously by way of example, it extends to other variants. Thus, other parametric models may be used. Other statistical studies may be conducted with different distribution tables. In the second embodiment, the procedure can be applied without permuting the images. The invention also extends to pathologies other than multiple sclerosis.

Annex I $$f(x) = p_1 \cdot (\exp(-g(x-p_2)^2) + p_5 g(x) = p_3 \cdot (x+(1+x^2)^{1/2}) + p_4 \cdot (x-(1+x^2)^{1/2})$$  I-b $$Y = X.\beta + \epsilon$$  I-b $$\dim Y = n \times 1$$

$$\dim X = n \times 2$$

$$\dim \beta = 2 \times 1$$

$$\dim \epsilon = n \times 1$$

$$t = c^T.\beta / (\sigma^2.c^T.(X^T X)^{-1}.c)^{1/2}$$  I-c $$c = [1\ 0]^T$$

The invention claimed is:

1. An image processing device, comprising:
   an input for receiving a time series of data sets representing comparable volume-based digital images, each data set comprising a position component and an intensity component,
   preprocessing means for modifying the data sets so as to obtain images registered geometrically and intensity-wise, and
   comparative processing means for examining sets of time series of image elements, so as to detect signs of variation therein, characterized in that the comparative processing means comprise:
   a modeling function, fitting a predetermined parametric model separately over at least one of the sets of time series of image elements, thereby providing information pairs of the kind: image element, time, wherein the predetermined parametric model is of the asymmetric Gaussian type, comprising a maximum amplitude parameter, a minimum amplitude parameter, a reference width parameter and a dissymmetry parameter; and
   a function for statistical analysis of the information pairs, which isolates those of the information pairs that are representative of a significant variation; and
   outputting means for displaying the obtained images.

2. The device as claimed in claim 1, wherein the predetermined parametric model further comprises a time at the peak parameter.

3. The device as claimed in claim 2, wherein the predetermined parametric model comprises a mean model whose parameters are established on a basis of sets of time series of image elements measured over developing pathological zones.

4. The device as claimed in claim 3, wherein said parameters of the mean model are obtained on the basis of sets of time-normalized and amplitude-normalized time series.

5. The device as claimed in claim 3, wherein the modeling function comprises an optimization function applied to the parameters of the parametric model.

6. The device as claimed in claim 1, wherein the modeling function furthermore comprises a general linear model applied to each set of time series of image elements so as to obtain, for each of said sets of series, a linear combination of at least a mean model ($X_1$) and a constant ($X_2$) according to a vector comprising at least a first and a second coefficient.

7. The device as claimed in claim 6, wherein the statistical analysis function comprises an operation of a T-test type revealing connected pathologically developing zone where said first coefficient is significantly different from zero.

8. The device as claimed in claim 1, wherein the modeling function furthermore comprises fitting at least one parametric model for at least one time series of image elements.

9. The device as claimed in claim 8, wherein at least one parameter of the model is fixed on the basis of sets of time-normalized and amplitude-normalized time series of image elements.

10. The device as claimed in claim 8, wherein at least one parameter of the predetermined parametric model is obtained on a basis of the set of the time series of said image element.

11. The device as claimed in claim 1, wherein the statistical analysis function comprises repeating, for at least one time series in a different time order from said image element, the modeling function comprising fitting a parametric model for a time series of an image element.

12. The device as claimed in claim 11, wherein the statistical analysis function comprises the determination of groups of neighboring image elements corresponding to series of image elements having at least one of the parameters of their model greater than a given threshold, the groups of neighboring image elements forming developing pathological zones of a size determined by the statistical analysis function.

13. The device as claimed in claim 12, wherein the statistical analysis function furthermore comprises a distribution of said developing pathological zones according to their size and a determination of significant developing pathological zones.

14. The device as claimed in claim 1, wherein the preprocessing comprises a rigid registration, followed by a correction of the temporal bias, characterized in that the correction of a temporal bias comprises the construction of a 3D joint histogram of the intensities of images taken pairwise.

15. The device as claimed in claim 14, wherein the correction of the temporal bias comprises a construction of a regression line on said 3D joint histogram by a robust orthogonal least squares technique.

16. The device as claimed in claim 14, wherein the correction of the temporal bias comprises a consequential correction of one of the images with respect to the other.

17. A method of image processing, comprising the following steps:
   a—receiving, with one or more computers, a time series of data sets representing comparable volume-based digital images, each data set comprising a position component and an intensity component, b—modifying, with one or more computers, the data sets so as to obtain images registered geometrically and intensity-wise, wherein the modifying step comprises complementary steps, c—fitting, with one or more computers, a predetermined parametric model separately over at least one of the sets of time series of image elements, thereby providing information pairs of the kind: image element, time, wherein the predetermined parametric model is of the asymmetric Gaussian type, comprising a maximum amplitude parameter, a minimum amplitude parameter, a reference width parameter and a dissymmetry parameter and d—isolating those of the information pairs that are representative of a significant variation by statistical analysis.

18. The method as claimed in claim 17, wherein the predetermined parametric model of step c—further comprises a time at the peak parameter.

19. The method as claimed in claim 18, wherein the parametric model of step c—comprises a mean model whose parameters are established on the basis of sets of time series of image elements measured over developing pathological zones.

20. The method as claimed in claim 19, wherein said parameters of the mean model of step c—are obtained on the basis of sets of time-normalized and amplitude-normalized time series.

21. The method as claimed in claim 19, wherein step c—comprises optimizing the parameters of the parametric model.

22. The method as claimed in claim 17, wherein step c—comprises c1—applying a general linear model to each set of time series of image elements so as to obtain, for each of said sets of series, a linear combination of at least a mean model and a constant according to a vector comprising at least a first and second coefficient.

23. The method as claimed in claim 22, wherein step d—comprises d1—applying to the information pairs an operation of a T-test type revealing connected pathologically developing zones where said first coefficient is significantly different from zero.

24. The method as claimed in claim 17, wherein step c—comprises
   c1—fitting at least one parametric model for at least one time series of image elements.

25. The method as claimed in claim 24, wherein step c1—furthermore comprises fixing at least one parameter of models on the basis of sets of time-normalized and amplitude-normalized time series.

26. The method as claimed in claim 24, wherein step c1—comprises obtaining at least one parameter of the model on a basis of the set of the time series of said image element.

27. The method as claimed in claim 24, wherein step d—comprises
   d4—distributing developing pathological zones according to their size,
   d5—determining one or more significant developing pathological zones.

28. The method as claimed in claim 17, wherein step d-comprises
   d1—repeating step c—for at least one series in a different time order from said image element.

29. The method as claimed in claim 28, wherein step d—comprises
   d2—determining groups of neighboring image elements corresponding to series of image elements having at least one of the parameters of their model greater than a given threshold,
   d3—determining the size of developing pathological zones formed by these groups of neighboring image elements.

30. The method as claimed in claim 17, in which step b—comprises performing a rigid registration, followed by a correction of the temporal bias, characterized in that step b—comprises performing the correction of a temporal bias by the construction of a 3D joint histogram of the intensities of image taken pairwise.

31. The method as claimed in claim 30, wherein step b—comprises performing the correction of the temporal bias by a construction of a regression line on said histogram by a robust orthogonal least squares technique.

32. The method as claimed in claim 30, wherein step b—comprises performing the correction of the temporal bias by the consequential correction of one of the images with respect to the other.

33. The method as claimed in claim 17, further comprising an initial step of imaging a human body during a predetermined period of time to produce a time series of data sets.

* * * * *